Dec. 24, 1968 D. I. POMERANTZ ET AL 3,417,459

BONDING ELECTRICALLY CONDUCTIVE METALS TO INSULATORS

Filed March 6, 1967 2 Sheets-Sheet 1

INVENTORS
DANIEL I. POMERANTZ
GEORGE WALLIS
JOHN J. DORSEY
BY
ATTORNEY

BONDING ELECTRICALLY CONDUCTIVE METALS TO INSULATORS

Filed March 6, 1967

2 Sheets-Sheet 2

INVENTORS
DANIEL I. POMERANTZ
GEORGE WALLIS
JOHN J. DORSEY
BY Robert Levine
ATTORNEY

United States Patent Office 3,417,459

Patented Dec. 24, 1968

3,417,459

BONDING ELECTRICALLY CONDUCTIVE METALS TO INSULATORS

Daniel I. Pomerantz and George Wallis, Lexington, and John J. Dorsey, Waltham, Mass., assignors to P. R. Mallory & Co., Inc., Indianapolis, Ind., a corporation of Delaware Filed Mar. 6, 1967, Ser. No. 620,794

21 Claims. (Cl. 29—472.9)

ABSTRACT OF THE DISCLOSURE

An electrically conductive element is bonded to an insulator element by placing the elements in close surface contact, heating the insulator element thus rendering it electrically conductive and applying a voltage across and passing a low electric current through the composite for a short time. The potential distribution characteristic of the insulator is predetermined from known data or testing operations, and the polarity of the insulator with respect to the conductive element, and thereby the direction of the current, are selected in accordance therewith and the arrangement of the elements in order to obtain optium bonding and adherence. In the production of laminates of alternate layers of inorganic insulator material and metal where there are at least two layers of one of these materials, where it is desired to accomplish simultaneous bonding, the insulator material is to be selected from those which possess suitable potential distribution charactersitics.

*The prior art in general*

Bonding of dissimilar materials, such as metal and glass, has been accomplished in various ways in the past one common method comprising metallizing the surface of the glass and fusing or soldering the metal to the metallized surface. This type of bonding, which is presently widely used, has proven to be expensive and often disadvantageous. Additional steps are required to metallize the insulator and to fuse or solder the metal to the metallized surface. In many cases, the temperature required to form a bond between the metal and the metallized surface is detrimental. This is especially true in the case of semiconductor processes where the semiconductor wafer is being hermetically sealed.

It has also been proposed to apply an insulator coating to a semiconductor by applying to the latter a metal oxide such as a silicon oxide and forming over that a layer of glass by depositing thereon a layer of glass particles and heating the composition to fuse the glass and thereby to form in situ a glass layer or coating chemically bonded to the semiconductor. That process likewise involves in most applications high temperatures for substantial periods of time with the corresponding danger of injuring the characteristics of the semiconductor. Further difficulties arise from the fact that the low-temperature glasses as a general rule have a coefficient of expansion substantially higher than that of the metals, such as silicon, with resulting tendency of the elements to separate or fracture upon cooling.

Th copending application of Pomerantz Ser. No. 583,907, filed Oct. 3, 1966, having a common assignee with the present application, discloses a method of bonding an insulator and a metal in which the bond is effected by placing the elements in close surface contact, heating the insulator to a temperature below its softening point, and passing a low electric current for a short time through the composite which results in the forming of a bonding region or zone between the elements comprising a strong seal. In the utilization of that process it was found to be most effective to employ a direct current source and to have the glass at a negative potential with respect to the metal. This was noted to be particularly true wih respect to borosilicate glass such as obtainable under the trademark "Pyrax," and the said prior patent application includes specific examples in which the potential is so applied to Pyrex glass.

The present inventors have determined that depending upon the potential distribution characteristic of the insulator equally good or perhaps more efficient and effective bonding may be accomplished with some types of insulators when the insulator is biased positively with respect to the metal. In some cases equally good and efficient bonding results are obtained whether the insulator is biased positively or negatively with respect to the metal.

As noted above the potential distribution characteristics of the insulator affect the functioning of the elecrical bonding and preferably determine the selection of the most effective electrical circuit connections. The potential distribution characteristics of an insulator is represented by a graphical plot of the voltage existing at various points within the insulator when a voltage is applied across the insulator. The characteristic is symmetrical when the absolute value of the voltage at any point in the insulator is the same irrespective of the polarity of the applied voltage. On the other hand, if the voltages at any point varies considerably when the applied voltage is reversed, the potential distribution characteristics is said to be asymmetric. Potential distribution characeristics for insulators and methods for determining them are well known and fully documented in the literature. See, for instance, "Space-Charge Development in Glass" by T. M. Proctor and Paul M. Sutton, Journal of the American Ceramic Society, vol. 43, No. 4, Apr. 1, 1960; "Space Charge and Electrode Polarization in Glass," by Paul M. Sutton, Journal of the American Ceramic Society, vol. 47, No. 5, pages 219–230, May 1964; and "Electrical Conductivity of Fused Quartz," by Julius Cohen, Journal of Applied Physics, vol. 28, No. 7, pages 795–800, July 1957.

As described in said Pomerantz patent application Ser. No. 583,907 it is believed that physical contact between the materials is promoted by an electrostatic attractive force which is generated when a potential is applied across the materials. Of course, the electrostatic attractive force must be large enough to overcome the restraining forces in the metal and the insulator in order to cause bonding. The magnitude of the electrostatic attractive forces will depend upon various factors including the polarity of the applied voltage and attendant direction of current with relation to the potential distribution characteristic of the insulator. If the potential distribution characteristic is substantially symmetrical, sufficient electrostatic attractive force will be generated irrespective of the polarity of the applied voltage. If the potential distribution characteristic is asymmetrical, significantly greater electrostatic attractive force will be generated by one polarity of applied voltage as contrasted to the application of the opposite polarity. Accordingly the polarity providing the greater force should be applied.

The magnitude of the attractive force per unit area between a point on the surface of the metal interface and a corresponding point on the surface of the insulator interface is given by the formula $F=\frac{1}{2}e(V/d)^2$ where $e$ is the dielectric constant, V is the potential difference between the two points and $d$ is the thickness of the gap between the two points. It can be seen, therefore, that the magnitude of the force depends critically on the thickness of the gap and the potential difference. The thickness of the gap between the surfaces to be joined can be controlled by controlling the flatness and smoothness of the surfaces. The potential difference is a function of the potential distribution characteristic and the applied voltage.

It has been found that glass to metal seals fabricated by the method of the present invention are good hermetic seals. Thus, the method of the present invention presents an effective means for hermetically sealing and protecting thin film circuits, integrated circuits, and similar devices. Some advantages of the present invention are:

(1) Bonds and hermetic seals between dissimilar materials can be accomplished at lower temperatures than with competing processes such as glass-to-metal seals created by fusion.

(2) Since there is no molten phase, distortion is reduced and dimensional tolerances are improved.

(3) Since the bonding can be made to take place at relatively low temperatures, materials of different thermal expansion coefficient can be joined with less danger of cracking.

(4) Insulators having different potential distribution characteristics may be bonded to opposite sides of a common metal element by a single bonding operation with the applied potential of the electrical power source oriented in an appropriate direction.

*Summary of the invention*

It is an object therefore of this present invention to provide an improved efficient method of joining a metal to an insulator by means of an electric bonding circuit including the steps of predetermining the potential distribution characteristics of the insulator and applying that determination in selecting and applying the electrical bonding circuit. The invention utilizes the potential distribution characteristic as so determined in achieving an optimum bond. The insulator element is of the type or character comprised of inorganic material having normally at room temperature a relatively high electrical resistivity. It may be one of the general classes of soft or hard glass, and particularly may be a borosilicate glass including Pyrex glass, fused quartz, alumina, porcelain, and sapphire and other materials which function similarly and have appropriate properties. A feature of such insulators is that by heating to a moderately elevated temperature they are rendered more conductive during the time of heating to the passage of small currents when a voltage is applied across them. The electrically conductive element useful in the invention includes metals or materials commonly employed in the form of semiconductors or transistors such as silicon, germanium and gallium arsenide. Examples of other metals are aluminum, platinum, beryllium, titanium, palladium, iron, nickel, chromium and tantalum.

In a specific form the invention comprises the bonding of a metal to an insulator of appropriate character by means of a bonding circuitry in which the insulator is at a positive potential with respect to the metal.

The invention further concerns an article of manufacture comprising an electrically conductive element and a glass insulator element integrally joined together by a strong hermetic seal derived by applying a voltage across the conduetor and insulator elements while in close surface contact with the insulator element heated sufficiently to form a bond under the conditions of applied voltage and resultant current, all as obtained by the method described generally above.

Other objects of the invention and the nature thereof will become apparent from the following description considered in conjunction with the accompanying drawings and wherein like reference numbers describe elements of similar function therein and wherein the scope of the invention is determined from the appended claims.

For illustrative purposes, the invention will be described in conjunction with the accompanying drawings in which.

Figure 1:
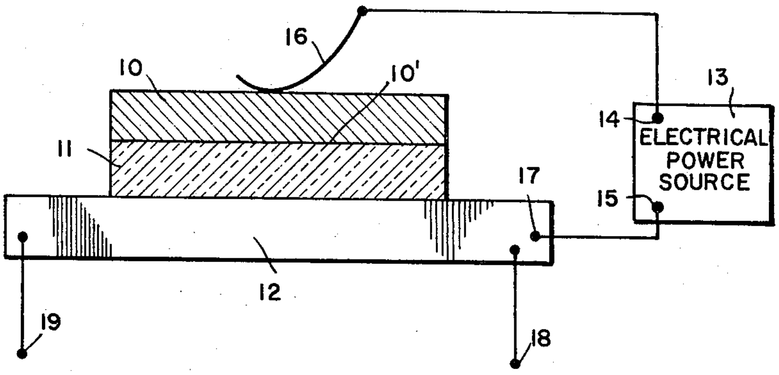
FIGURE 1 is a side view illustrating a simple method of joining an electrically conductive material to an insulator.

Referring now to FIGURE 1, the method of the present invention can be visualized in conjunction with the following description.

An electrically conductive material comprising an element 10, which may be a metal, silicon for example, is placed in close surface contact with a glass insulator element 11. There is an interface 10', therefore, between the metal 10 and the insulator 11. The sandwich of the metal 10 and insulator 11 is placed on a conductive platen 12 for heating the insulator 11.

There is a power source 13 which may be a simple direct current power source having output terminals 14 and 15. Suitable electrical connection is made to the metal element 10 from the source 13 as for example through a spring contact 16 connected to terminal 14. Electrical contact to the insulator 11 is made via the platen 12 which has a terminal 17 connected to the terminal 15 of the power source.

Electrical power for heating the platen 12 is provided across a set of terminals 18 and 19. Other techniques for heating the platen 12 and, consequently, the insulator 11 can be employed dependent upon the attendant circumstances in the particular case. For instance, the platen 12 can be heated by gas flames or by induction heating technique, or the unit can be heated in an oven. The insulator is heated to a temperature in the range of 150° C. to 1200° C. and preferably within the range of 300° C. to 700° C.

The power source 13 is a means for providing the necessary voltage and current. If terminal 14 is positive with respect to terminal 15, current will flow from terminal 14 through the contact 16, metal 10, insulator 11 and platen 12 to the terminal 15. If the terminal 15 is positive with respect to the terminal 14, current will flow from the terminal 15 through the platen 12, insulator 11, metal 10, and contact 16 to the terminal 14.

Figure 2:
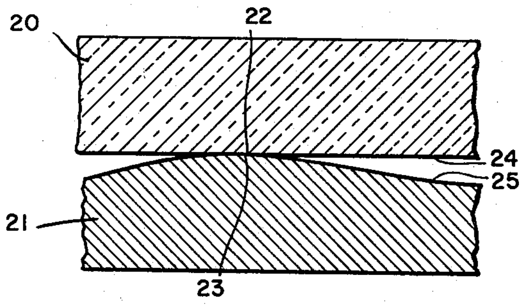
FIGURE 2 is a cross-sectional view of a typical interface between an electrically conductive material and an insulator.

Referring now to FIGURE 2, a typical cross-section of an interface between a metal 21 and an insulator 20 can be discussed. The metal may be a silicon semiconductor and the insulator a selected glass. The cross-section is greatly magnified to facilitate an explanation of the present invention.

When the insulator 20 is placed on the metal 21, intimate contact occurs only at a few points such as the point indicated at 22 on the interface of the insulator 20 and at 23 on the interface of the metal 21. A gap whose thickness might be anywhere from a few angstroms to several thousand angstroms, depending on the surface finish of the materials, is present between the point 24 on the interface of the insulator 20 and the point 25 on the interface of the metal 21. Thus, the point 24 can bond to the point 25 only if the materials in this region can first be brought into intimate contact with each other.

The exact physical and/or chemical phenomena are not certain but it is believed that with the application of the bonding circuitry derived from the electric power source 13 an electrostatic force is produced at and adjacent to the points 22, 23 of an amount per unit area in accordance with the formula $F=\frac{1}{2}e(V/d)^2$ referred to heretofore. The glass having been heated sufficiently to render it electrically conductive it will also have been made more flexible and perhaps slightly plastic and/or the metal may also have been rendered more flexible. As a result the electrostatic force will draw the opposed surface areas into contact progressively closing the gap and resulting in a continuous permanent strong bond and a hermetic seal throughout the interface.

Figure 3:
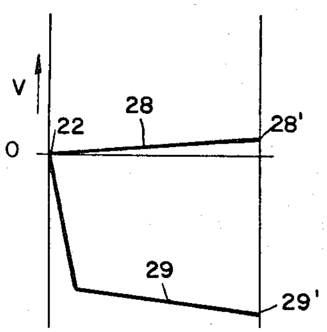
FIGURE 3 is a plot of the asymmetrical potential distribution within an insulator of the alkali-rich glass variety such as soft glass and Pyrex No. 7740.
Figure 4:
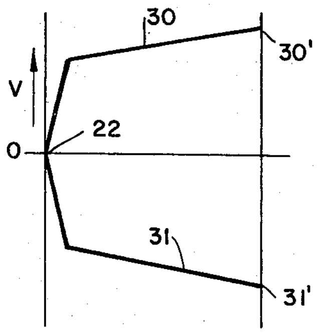
FIGURE 4 is a plot of the symmetrical potential distribution within an insulator of a substantially alkali-free glass variety such as fused quartz.
Figure 5:
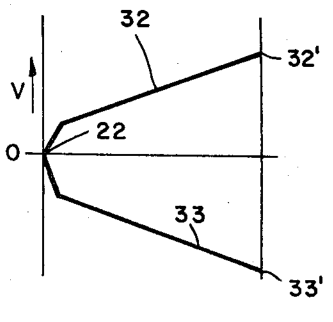
FIGURE 5 is a plot of the symmetrical potential distribution within an insulator of a substantially alkali-free hard glass variety such as Corning "7059 glass"

Referring now to FIGURES 3, 4 and 5, these represent potential distribution characteristics for various insulators. In the plots the ordinates represent the voltages and the abscissa represent the interface into the insulator. These curves represent measurements made under conditions appropriate to bonding. In the plots, the respective upper curves 28, 30 and 32 represent the case where the insulator 20 is positive with respect to the metal 21 and the lower curves 29, 31 and 33 represent the case where the insulator 20 is negative with respect to the metal 21. Only a portion of the potential distribution curves are pictured and the points bearing a prime mark indicate respectively a point within the insulator spaced a substantial distance from either face thereof. The shape of the curve at the interface indicates the polarity of the potential to be applied to the bonding elements for optimum bonding. Where the slopes are different optimum bonding is obtained by selecting a polarity which will provide the steeper slope. Where the slopes are substantially the same efficient bonding may be obtained by applying either polarity to the bonding elements.

The plot illustrated in FIGURE 3 is for an alkali-rich soft glass such as Pyrex No. 7740. It can be seen that the slope at the interface of curve 29 is steeper than curve 28. Thus, optimum bonding is obtained, when the insulator is Pyrex No. 7740, by making the insulator negative with respect to the metal 21.

Although the exact technical phenomena that take place in the bonding operation are not readily determinable the following is a feasible explanation for a part of the phenomena that occur. The electric field at the interface equals the slope of the voltage at the interface and the relation between the field in the insulator medium and the field in the gap is given by the well known relation $$e_1E_1=e_2E_2$$

where $e$ is the dielectric constant and E is the electric field and the subscript 1 refers to the insulator medium and the subscript 2 refers to the gap medium. Thus it is seen that a large field near the insulator surface will necessarily produce a large field in the gap as well. As noted above, the electrostatic attractive force in the gap is proportional to the square of the electric field in the gap. Thus, a greater attractive force is developed when the insulator 20 is negative with respect to the metal 21.

It is believed that the above-described asymmetrical polarization in a glass having a substantial alkali content in the form of sodium is produced by cationic migration of the mobile positive ions in the glass. This takes place in such a way that the positive ions migrate towards the cathode where they become largely neutralized. As a result, the relatively immobile negative ions near the anode set up a space charge which produces a large field. The asymmetrical potential distribution attending the cationic migration may be more simply defined as a asymmetrical potential distribution of the cationic character. Insulator materials containing mobile oxygen ions which are negative can be expected to produce an anionic migration characteristic and have an asymmetrical potential distribution in the opposite direction from the insulator materials having substantial alkali content. Regardless of the precise technical phenomena or reasons it is deemed appropriate to refer to insulator materials having an asymmetrical potential distribution opposite to that of the cationic character described above, as having an asymmetrical potential distribution of the anionic character.

The plot illustrated in FIGURE 4 is for a substantially alkali-free insulator such as a fused quartz. It can be seen that the electric field at the interface O is substantially the same irrespective of whether the insulator 20 is positive or negative with respect to the metal 21. Thus, the magnitude of the attractive force in this case is not dependent on the polarity of the insulator 20 and metal 21. The curves 30 and 31 reveal that the fused quartz has substantially symmetrical potential distribution.

The plot illustrated in FIGURE 5 is for a substantially alkali-free hard glass such as Corning "7059 glass". It can be seen that the curve 32 is substantially symmetrical with the curve 33 and, therefore, that the electric field at the interface O is substantially the same irrespective of whether the insulator 20 is positive or negative with respect to the metal 21.

It will be understood that the curves of FIGURES 3, 4 and 5 are only representative of various types of glass. Also the values are only approximate and are intended primarily as illustrative. For a particular glass the curves for the positive and negative potential of the glass may not be as different in values as those in FIGURE 3 nor as nearly equal in values as those of FIGURES 4 and 5.

Having determined the potential distribution characteristics the elements are bonded by a means illustrated in general principle by FIGURE 1. The elements and particularly the insulator element represented at 11 are heated to an appropriate temperature and the electrical power source is applied across the composite with the polarity selected to provide the quickest and most effective bonding operation. For glass having the potential distribution characteristics generally similar to that illustrated in FIGURE 3 such as Pyrex No. 7740 glass and at least most soft glasses the glass is connected to the negative terminal of the power supply. In the case of certain quartz glasses which are substantially symmetrical in potential distribution the glass may be made either negative or positive. It may be determined that certain other glasses are asymmetrical in the opposite polarity to that of Pyrex glass of which the voltage profile is depicted in FIGURE 3, and in such case for the most effective and efficient bonding operation the glass should be made positive with respect to the metal.

In the above discussion the electrical power source for the bonding circuit has been indicated as of the direct current type. However, a pulsating current will effect a bond and even an alternating current particularly in the case of a glass having a symmetrical potential distribution characteristic.

In the practice of the invention the temperature to which the glass should be heated to render it sufficiently conductive and flexible will vary dependent upon its type and specific composition but in general it will be in the range of 150° C. to 1200° C. As specific examples for Pyrex glass and soft glasses the temperature will preferably be in the range of about 300° C. to 700° C., for quartz glass in the higher range of about 600° C. to 1200° C., and for the 7059 glass referred to above the preferred range will be about 600° C. to 700° C. this glass having a softening point of approximately 840° C.

The exact values of the current and the applied voltage, the time period, and the temperature will vary dependent upon the conditions including the character of the materials concerned.

The following are representative examples of the invention in which the insulator is made positive.

A fused quartz insulator having a symmetrical potential distribution was selected and bonded to oxide free silicon using approximately 250 microamperes/cm.[2] for approximately 60 seconds the quartz being at a temperature of about 600° C., and the bonding circuit being a direct current source with the quartz glass connected to the positive terminal. Accordingly the flow of current was from the glass to the silicon element as commonly referred to in the art.

As stated the value given for the current density is only approximate and not critical. Within reasonable values the lower the current the greater the time and conversely. Suitable conditions may be readily determined since the formation of the bond can normally be observed visually. In general a finite current of low amperage serves the purpose.

Again silicon was bonded in this case to a hard glass commercially available as Corning "7059 glass" under conditions generally similar to the preceding example using in this case approximately 250 microamperes/cm.[2] for approximately 60 seconds at a temperature of about 500° C., the bonding circuit being as in the preceding example with the glass positive.

As another example aluminum foil was bonded to 7059 hard glass using approximately 100 microamperes/cm.[2] using approximately 60 seconds at a temperature of about 500° C., with the bonding circuit as in the two preceding examples.

In the three examples just described the insulator elements, fused quartz and 7059 hard glass, each had a substantially symmetrical distribution characteristic as heretofore described in connection with FIGURES 4 and 5 respectively. Accordingly bonding can be effective in each of the three examples under substantially like conditions but employing a current in the reverse direction with the insulator connected to the negative terminal of the power source.

As described in said pending application of Pomerantz Ser. No. 583,907 and as described herein in connection with FIGURE 3, in the case for example of a borosilicate glass such as Pyrex which has an asymmetrical potential distribution of the cationic character optimum bonding is effected by making the insulator at a negative potential with respect to the metal. Utilizing insulator materials having an asymmetrical potential distribution in the opposite direction, that is of the anionic character as heretofore defined require for optimum bonding that the insulator be made positive with respective to the metal.

Figure 6:
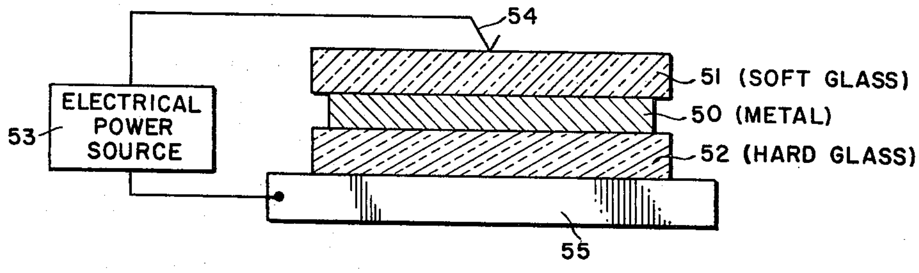
FIGURE 6 illustrates the bonding of an insulator of asymmetrical potential distribution characteristic and an insulator of symmetrical potential distribution characteristic to opposite sides respectively of a common metal element.
Figure 7:
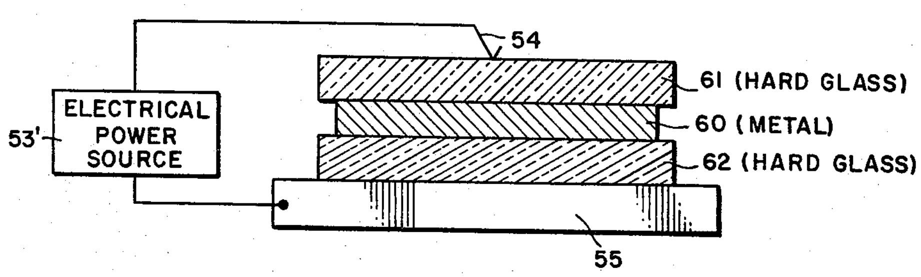
FIGURE 7 depicts a similar arrangement but in this case the insulator elements are both of symmetrical potential distribution characteristic.
Figure 8:
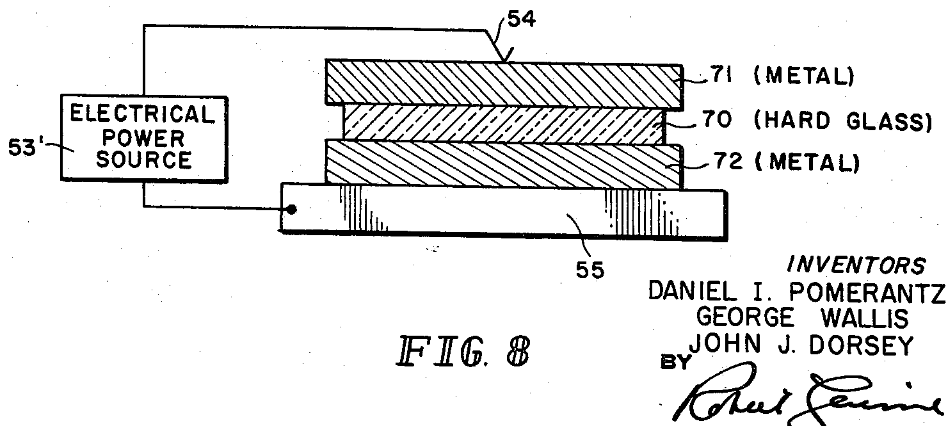
FIGURE 8 embodies a somewhat similar arrangement in which an insulator of symmetrical potential distribution characteristic is sandwiched between two metal elements.

FIGURES 6 to 8 depict simple basic examples of applications of the principles of the present invention embodying plural laminae of at least one of the elements. The composite units in each case were placed in a vertical tube furnace and heated to temperature within the range of 630° C. to 700° C. and electrodes applied to the opposite sides of the unit as shown in the figures while in the furnace. The elements in FIGURES 6 to 8 are of course greatly magnified and out of proportion in some respects. In this example the glass insulators were about .002 of an inch thick, but in general the glass may be thicker or thinner within any limits which normally would be desirable to employ, the limit as to thinness being governed by capability of handling preparatory to bonding.

In the example of FIGURE 6 the metal silicon element 50 is sandwiched between two insulator elements 51 and 52. A direct current electric power source 53 has its opposite terminals connected to the respective insulator elements 51, 52. In this case the insulator 51 is a borosilicate glass Pyrex which has been determined to be asymmetrical as to potential distribution of the cationic character as represented in general in FIGURE 3. Accordingly it is made negative potential with respect to the metal 50, as by connecting it to the negative terminal of a direct current source at 53, the connection to the insulator being through a steel probe 54; and the positive terminal of the source 53 being connected to the insulator 52 through a steel contact plate 55 which also serves as a support for the unit. In the test as performed insulator 52 was Corning No. 7059 hard glass having a symmetrical potential distribution as heretofore described in connection with FIGURE 5. Alternatively it could be a fused quartz for example having a similar potential distribution or it could be an insulator having an asymmetrical potential distribution of anionic character opposite to that of the Pyrex. The unit was heated to within the approximate range of 650° C. to 670° C. and a direct current potential applied at an approximately constant voltage of 1400 volts for about one minute. The silicon was effectively bonded to each of the insulators.

FIGURE 7 shows a metal element 60 sandwiched between two insulators 61 and 62 similarly to FIGURE 6. The insulators have been predetermined to have a symmetrical potential distribution. Accordingly the electric potential source 53' may be oriented in either direction. The general arrangement is otherwise the same as in FIGURE 6. In a test example the insulators were a hard glass Corning No. 7059 referred to heretofore. The temperature was in the range of 650° C. to 670° C. and the applied voltage was maintained at about 1400 volts for one minute. The silicon was completely bonded to each glass layer.

FIGURE 8 shows an insulator element 70 sandwiched between two metal elements 71 and 72. In this case if the insulator has a symmetrical potential distribution the electric potential source may be in either direction, but if the insulator has an asymmetrical potential distribution of either the cationic or anionic character the bonding to one of the metals may not be as good as the bond to the other metal or a greater time period may be required. In an actual test the metal elements 71, 72 were a silicon and the intervening insulator was No. 7059 glass with a symmetrical potential distribution. The bonding conditions were substantially the same as in the example illustrated in FIGURE 7. An effective and adequate bond resulted.

The three samples just described comprise units having three layers but it will be understood that units having more layers and different relative arrangements and different materials may be bonded providing the principles of the invention are observed including the potential distribution characteristics of the respective insulator elements. If it is desired for example to provide a laminar structure comprising alternate layers of insulator material and metal with at least two layers of one of said materials it will be important to select insulator material which posseses substantial symmetrical potential distribution and the bonding will thereby be effected at each interface regardless of the polarity of the potential applied across the unit.

It can be seen that the present invention has a wide scope of applications as hereinabove described, and its representative embodiments are merely illustrative and not exhaustive in scope. Accordingly, since many widely differing embodiments of the invention may be made without departing from the scope thereof, it is intended that all matters contained in the above description and shown in the accompanying drawings shall be interpreted as illustrative and not in a limiting sense.

We claim:

1. In the method of bonding an insulator element of normally high electrical resistivity inorganic material to a metallic element employing the steps of juxtaposing said elements in close surface contact relationship, and applying a potential across the juxtaposed elements with the insulator element heated below its softening point sufficiently to increase substantially its electrical conductivity thereby producing a finite electric current of low amperage through the juxtaposed elements, the improvement comprising, predetermining the potential distribution characteristic of the insulator element, and applying the potential with the polarity oriented in accordance with the predetermined potential distribution characteristic to effect bonding between said elements.

2. A method in accordance with claim 1 in which the polarity orientation of the applied potential is such as to provide the higher potential difference across the interface between the insulator element and the metal element.

3. A method in accordance with claim 1 in which the insulator element is a glass.

4. A method in accordance with claim 1 in which the metallic element is a semiconductor.

5. A method in accordance with claim 1 in which the metallic element is silicon.

6. A method of bonding a metallic element to an insulator element of normally high electrical resistivity selected from the group of insulators having a substantially symmetrical potential distribution and those insulators having an asymmetrical potential distribution of the anionic character comprising, juxtaposing said elements in close surface contact relationship, applying a potential across the elements with the said insulator element heated to a temperature below its softening point thereby increasing substantially its electrical conductivity and producing a finite electric current of low amperage through the juxtaposed elements in the direction from the insulator element to the metallic element.

7. A method in accordance with claim 6 in which the insulator element is a glass.

8. A method in accordance with claim 6 in which the insulator element is a quartz glass.

9. A method in accordance with claim 6 in which the insulator element is a substantially alkali-free hard glass.

10. A method in accordance with claim 6 in which the metallic element is a semiconductor.

11. A method in accordance with claim 6 in which the metallic element is silicon.

12. A method in accordance with claim 6 in which the insulator element is a glass and the metallic element is a semiconductor.

13. A method in accordance with claim 21 in which said electrically conductive element is a metal.

14. A method in accordance with claim 21 in which said electrically conductive element is silicon.

15. A method in accordance with claim 21 in which said insulator element is a substantially alkali-free type of glass.

16. A method of bonding a metallic element between opposed insulator elements of normally high electrical resistivity inorganic material, one of said insulator elements having a substantially symmetrical potential distribution and the other an asymmetrical potential distribution, comprising assembling said elements in close surface contact relationship between adjoining elements, heating said insulator elements to a temperature below their softening points thereby increasing substantially their electrical conductivity, and applying a potential across the assembled unit producing a finite current of low amperage through the unit the polarity of the potential being chosen in accordance with the type of asymmetry of the one insulator to provide bonding between it and the metal element.

17. A method in accordance with claim 16 in which the asymmetrical insulator element is a borosilicate glass and is made negative in the applied potential.

18. A method of bonding a metallic element between opposed insulator elements of normally high electrical resistivity inorganic material, each of said insulator elements having a substantially symmetrical potential distribution comprising, assembling said elements in close surface contact relationship between adjoining elements, heating said insulator elements to a temperature below their softening points thereby increasing substantially their electrical conductivity, and applying a potential across the assembled unit producing a finite current of low amperage through the unit and effecting a bond between each pair of adjoining elements.

19. A method of bonding an insulator element of normally high electrical resistivity inorganic material having a substantially symmetrical potential distribution between metal elements comprising, assembling said elements in close surface contact relationship between adjoining elements, heating said insulator element to a temperature below its softening point thereby increasing substantially its electrical conductivity, and applying a potential across the assembled unit producing a finite current of low amperage through the unit and effecting a bond between each pair of adjoining elements.

20. In a process of providing a laminar structure comprising alternate layers of inorganic insulator material and metal there being at least two layers of one of said materials, the steps which comprise selecting as the inorganic insulator material one which possesses substantially symmetrical potential distribution, assembling said layers as a unit in serially close surface contact, heating said insulator material to a temperature below its softening point, and applying a potential across the assembled unit producing a finite current of low amperage through the unit and effecting a bond between each pair of adjoining laminae.

21. In the method of bonding an inorganic insulator element of normally high electrical resistivity to a metallic element employing the steps of juxtaposing said elements in surface contact, the adjoining surfaces being substantially smooth and complemental but having points of contact and appreciable gaps, heating said insulator element to a temperature below its fusion point sufficient to render it electrically conductive, applying an electric potential across the juxtaposed elements to pass an electric current through said points of contact and to create an electrostatic field between the adjoining surfaces, causing the juxtaposed elements to be attracted into intimate contact progressively to close said gaps and to form a bond between said adjoining surfaces, the improvement comprising, predetermining the potential distribution characteristic of the insulator element, and applying said potential with a polarity such as to provide the greatest potential gradient within said insulator in a region adjacent the interface between said insulator element and said metallic element.

References Cited

UNITED STATES PATENTS

| | | | |
|---|---|---|---|
| 3,256,598 | 6/1966 | Kramer et al. | 156—272 |
| 2,567,877 | 9/1951 | De Ment | 204—16 |

OTHER REFERENCES

Handbook of Chemistry and Physics, 44th edition, 1961, p. 2627.

JOHN H. MACK, *Primary Examiner.*

T. TUFARIELLO, *Assistant Examiner.*

U.S. Cl. X.R.

29—589; 204—16; 156—272; 29—470